(12) United States Patent
Wlotkowski et al.

(10) Patent No.: US 8,465,054 B1
(45) Date of Patent: Jun. 18, 2013

(54) SYSTEM FOR PROVIDING CRASH COMPATIBILITY BETWEEN AUTOMOTIVE VEHICLES

(75) Inventors: Mark Wlotkowski, Royal Oak, MI (US); Eric William Barrett, Milford, MI (US); Michael M. Azzouz, Livonia, MI (US); Yu-Kan Hu, Ypsilanti, MI (US); Leonard Anthony Shaner, New Baltimore, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/463,835

(22) Filed: May 4, 2012

(51) Int. Cl.
*B62D 21/00* (2006.01)

(52) U.S. Cl.
USPC ...... 280/781; 280/784; 180/311; 296/187.03; 296/187.09; 296/187.11

(58) Field of Classification Search
USPC ...... 280/781, 784; 180/311, 312; 296/187.03, 296/187.09, 187.11
See application file for complete search history.

(56) References Cited

U.S. PATENT DOCUMENTS

| | | | | |
|---|---|---|---|---|
| 3,860,258 | A * | 1/1975 | Feustel et al. | 180/312 |
| 6,302,458 | B1 * | 10/2001 | Wang et al. | 293/132 |
| 7,669,688 | B2 * | 3/2010 | Yamaguchi et al. | 180/312 |
| 7,699,347 | B2 * | 4/2010 | Shoap | 280/784 |
| 7,887,123 | B2 * | 2/2011 | Honji et al. | 296/187.09 |
| 7,900,964 | B2 * | 3/2011 | Chretien et al. | 280/784 |
| 8,056,926 | B2 * | 11/2011 | Okabe et al. | 280/784 |

\* cited by examiner

*Primary Examiner* — Toan To
(74) *Attorney, Agent, or Firm* — Joseph E. Root

(57) ABSTRACT

A system for providing crash compatibility between automotive vehicles is disclosed. The system includes crush horns and a bracket located below the longitudinal axis of the crush horns.

5 Claims, 2 Drawing Sheets

SYSTEM FOR PROVIDING CRASH COMPATIBILITY BETWEEN AUTOMOTIVE VEHICLES

BACKGROUND

This application generally relates to vehicle chassis design, and more particularly, relates to structures for providing crash compatibility between automotive vehicles.

Various crash tests conducted by National Highway Traffic Safety Administration (NHTSA) and Insurance Institute for Highway Safety (IIHS) have revealed that vehicle compatibility is an important vehicle attribute affecting occupant safety during frontal and offset crashes. Vehicle compatibility can be defined as the ability of a vehicle to structurally harmonize with another vehicle in a crash event, and relates to vehicle characteristics such as weight, ground clearance, bumper height and shape of the vehicle front end. Accordingly, the front-end structures, for example, front aprons, fender supports, crush horns, etc., of a vehicle are designed for providing a controlled crash response, as well as maintaining integrity of the occupant compartment in the event of frontal and offset crashes.

During the frontal or offset crashes, the front-end structures absorb the crash energy and are crushed to attenuate the crash pulse. Conventionally, various approaches have been adopted to increase the load bearing capacity of the front-end structures for mitigating the crash effect. Common approaches include increasing the thickness of frontal structures or the addition of reinforcement members to these structures for efficient absorption of the crash energy. Although such approaches may provide a method to manage the crash impact, an increased design complexity, weight and cost is often added to the manufacturing of a vehicle.

Therefore, there exists a need for a simple, light weight and cost-effective solution to mitigate the risk in frontal crashes.

SUMMARY

One embodiment of the present application describes a system for providing crash compatibility between automotive vehicles. The system includes crush horns attached to the frame assembly including cross members. These cross members are located at various heights along the frame assembly with respect to the longitudinal axis of the crush horns. The system further includes a bracket located on a first cross member that is located near the front-end of the crush horns. In implementation, the bracket can have a discontinuous front surface based on the predetermined criteria for managing the crash energy.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is written with reference to the figures. Exemplary embodiments are described to illustrate the subject matter of the disclosure and not to limit its scope, which is defined by the appended claims.

Overview

The present disclosure describes a system for providing crash compatibility between automotive vehicles. The system includes primary crash management structures, for example, crush horns, a bracket, and cross members. The cross members are attached to the frame assembly, and are located below the longitudinal axis of the crush horns. In an embodiment, the bracket is located on a first cross member that is located near the front end of the crush horns. The bracket behaves as a secondary crash management structure that provides an offset in height for a compatible frontal or offset crash between vehicles having a difference in their heights.

The bracket provides a simple, light-weight and cost-effective solution to crash compatibility between automotive vehicles without requiring an adjustment in bumper height.

Exemplary Embodiments

Figure 1A:
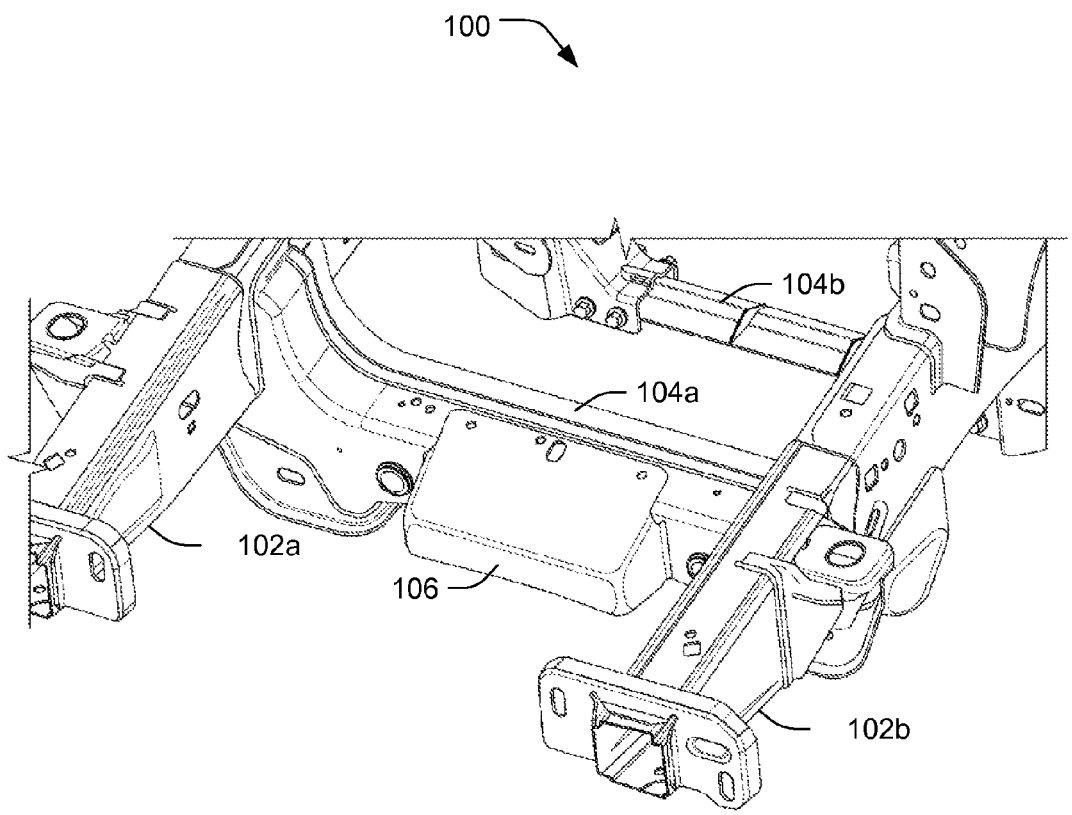
FIG. 1A illustrates a perspective view of a vehicle frame with an exemplary bracket according to a first implementation of the present subject matter.

FIG. 1A illustrates a perspective view of a vehicle frame with an exemplary bracket according to a first implementation of the present subject matter. Generally, a vehicle frame assembly 100 includes a horn section and longitudinal members, for example, frame rails. These longitudinal members are typically welded or riveted to a number of cross members. The front-end of the longitudinal members terminates in the horn section that extends to support a bumper, not shown in the figure. The horn section includes crush horns, such as a crush horn 102a and a crush horn 102b, hereinafter collectively referred to as crush horns 102, which can also provide a means for attaching the bumper to the vehicle frame assembly. Such an attachment method strengthens the bumper, and provides an additional load bearing capacity to the front-end of the vehicle. The frame assembly 100 further includes a number of cross members, for example, a first cross member 104a and a second cross member 104b, hereinafter collectively referred to as cross members 104. These cross members 104 are transversely attached to the longitudinal members or frame rails to provide mechanical stability and balance to the crush horns 102. Further, the cross members 104 are generally located below the longitudinal axis of the crush horns 102, such that the cross members 104 are located closer to the ground.

A frontal or offset crash may occur between vehicles that have a difference in their relative heights. Due to this difference in height of the vehicles, the primary crash management structures, such as the crush horns 102 of a first crashing vehicle may not align with those of the second crashing vehicle. As a result, when the first vehicle, which has a height lesser than that of the second vehicle, collides with the second vehicle in a frontal or offset crash, the first vehicle may tend to dive under the second vehicle due to the crash impact, thereby proposing a hazard to occupant safety. Therefore, the primary crash management structures remain less effective in managing the crash energy when there is a difference in the heights of the colliding vehicles.

In an embodiment, a single bracket 106 is mounted on one of the cross members associated with the primary crash management structures. The bracket 106 is box shaped, with one back side open (not shown in the figure), the one back side being attached to a cross member. To help facilitate attachment to the cross member, the bracket 106 includes top flange that overlaps a portion of the cross member. In an example, the bracket 106 can be mounted over the first cross member 104a associated with the crush horns 102, such that the first cross member 104a is located near the front-end of the crush horns 102. Such mounting of the bracket 106 can be realized using a variety of mechanisms known in the art. For example, the bracket 106 can be attached to the first cross member 104a by welding or bolting. The bracket 106 can be manufactured using a range of materials such as metals, alloy metals, composites and polymeric materials. Specific examples of these materials include, but are not limited to, carbon steel, aluminum, tungsten, high-strength low-alloy steel, nylon, carbon-fiber-reinforced-plastic, etc.

In an implementation, the single bracket 106 can include a first bracket half and a second bracket half (not shown in the figure), which can be manufactured separately. During assembling of the vehicle parts, the first bracket half and the second bracket half can be welded together, to ensure a reliable attachment between the two brackets halves. However, it is to be understood that the first bracket half can be attached to the second bracket half using a variety of techniques known in the art. In another implementation, the first bracket half and the second bracket half may not be welded together, and can be mounted separately on the first cross member 104a.

Figure 1B:
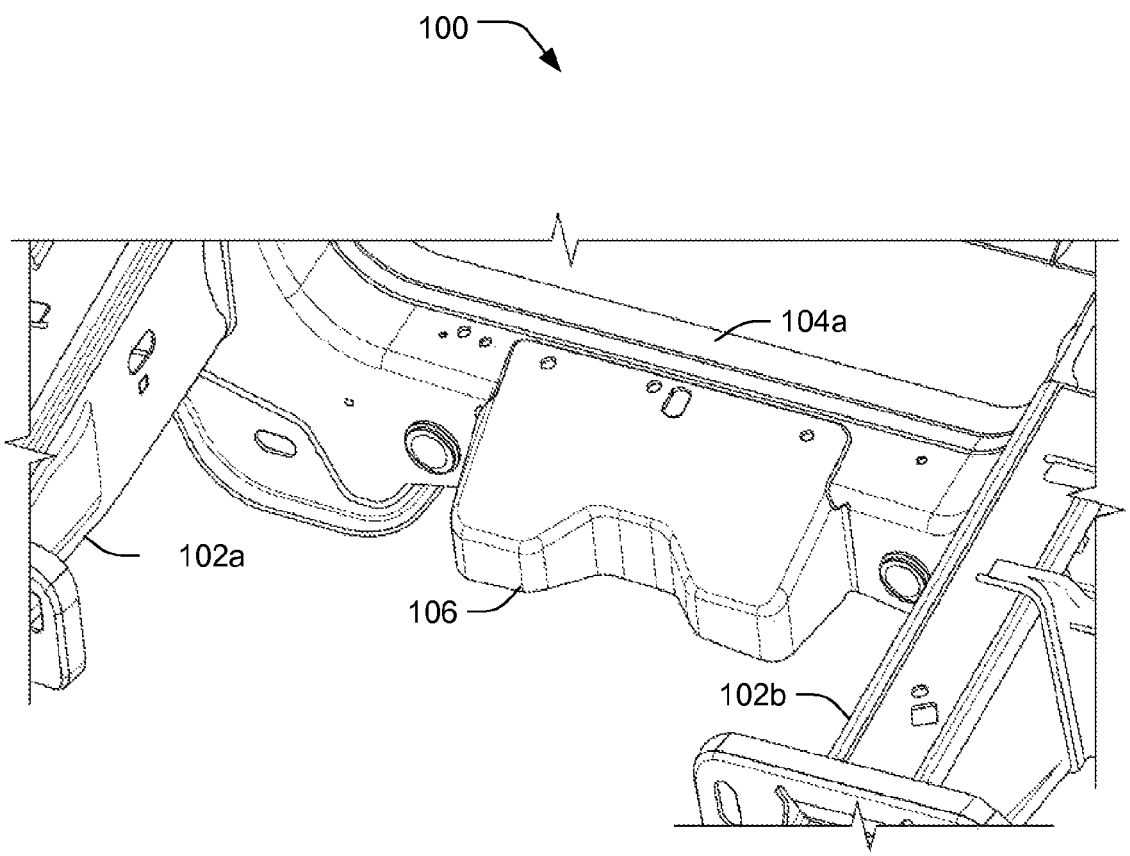
FIG. 1B illustrates a perspective view of the vehicle frame with the exemplary bracket according to a second implementation of the present subject matter.

Further, the dimensions and shape of the bracket 106 can be adapted based on a variety of pre-determined criteria for efficient crash energy management. For example, the dimensions of the bracket 106 can be adapted to have a box-shape for distributing a minimum crash force of 100 Kilo Newton before the bracket 106 is crushed to a distance no more than 400 millimeters. In another implementation, the bracket 106 can be adapted to a shape having discontinuous front face or surface, provided with a central indentation, as illustrated in FIG. 1B.

When a frontal crash occurs between the first vehicle and the second vehicle, discussed previously, such that the second vehicle includes the bracket 106, the crash management begins with collapsing of the primary crash management structures, for example, crush horns 102, bumper, etc. During the crash impact, the crash forces push the primary crash management structures rearwards to manage the crash energy. However, when the first vehicle begins to dive under the second vehicle due to the difference in relative heights of the vehicles, the bracket 106 attached to the second vehicle aligns with a crash management structure on the first vehicle, and is crushed due to the frontal crash impact. Such crushing of the bracket 106 reduces the crash momentum, thereby restraining the crash pulse from proceeding into the occupant compartment. The bracket 106 therefore helps to compensate for the difference in relative heights of the two vehicles, and provides a light weight secondary structure to help manage the crash energy.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

We claim:

1. A system for providing crash compatibility between automotive vehicles, comprising:
   a frame assembly including a plurality of crush horns and at least one cross member, the cross-member being connected to and extending substantially beneath the plane formed by the crush horns; and
   at least one bracket located on the at least one cross member and extending toward the front-end of the crush horns.

2. The system as claimed in claim 1, wherein the bracket is welded to the at least one cross member.

3. An automotive vehicle comprising:
   at least one cross member attached to a frame assembly; and
   a frame assembly including one or more crush horns, and at least one cross-member attached to the crush horns, the cross-member being mounted substantially beneath the plane formed by the crash horns, and
   a bracket located on the at least one cross member, the bracket being positioned to extend towards a front end of the crush horns.

4. The automotive vehicle as claimed in claim 3, wherein the bracket is welded to the at least one cross member.

5. The automotive vehicle as claimed in claim 3, wherein the at least one cross member is located near the front-end of at least one crush horn included in the frame assembly.

* * * * *